INVENTOR
ANTONIO PIETRI RIVERA

BY Scrivener & Parker

ATTORNEYS

United States Patent Office 2,985,711
Patented May 23, 1961

2,985,711

SELECTIVE MOTOR STOP CONTROL FOR TELEPRINTERS

Antonio Pietri Rivera, Calle Chile 255, Hato Rey, Puerto Rico

Filed July 9, 1958, Ser. No. 747,451

13 Claims. (Cl. 178—4.1)

This invention relates to teleprinters and, more particularly, to a selective motor stop control therefor.

In the past, many motor stop control systems have been developed for adapting teleprinters to automatic call-code party line operation. These systems, however, are subject to innumerable disadvantages, one of the primary problems being their extremely high costs of production, installation and maintenance.

Many electrical and mechanical modifications of presently used teleprinters are necessary to install the prior art control systems. For example, not only does the teleprinter itself undergo modification, but additional auxiliary equipment is needed at the central station and each of the individual stations, such as calling facilities for the retransmission of received messages.

It is, therefore, an object of this invention to provide a selective motor stop control unit for teleprinters, which is low in production, installation and maintenance costs.

Another object of this invention is to provide a motor stop control for teleprinters which requires no mechanical modification of the original teleprinter structure other than the addition of a minimum number of new parts.

Another object of this invention is to provide a selective motor stop control for teleprinters which requires no equipment external of the original teleprinter unit.

Still another object of this invention is to provide a selective motor stop control for teleprinters which eliminates the need for auxiliary call-code equipment in a telegraph network.

Still another object of this invention is to provide a selective motor stop control for teleprinters whereby the selective station call signal may be included as a part of the transmitted message address for automatic selection of the desired teleprinter station.

Still another object of this invention is to provide a selective motor stop control for teleprinters which does not change the characteristic impedance of the message transmission line.

Still another object of this invention is to provide a selective motor stop control for teleprinters having a wide range of call-code combinations for party line use.

These and other objects of this invention will become apparent from the following drawings and description thereof.

The selective motor stop control comprises an electromechanical means which employs standard teleprinter operation code signals in selectively energizing one or more of a plurality of teleprinter devices which are connected on a party-line basis on a common communications channel. The selective signals used may be transmitted from and originated at any one of the plurality of teleprinters on the party-line system.

Basically, all the teleprinters in the system will be activated and controlled by a particular call-code. The following are the components of the call-code system and are utilized in the order in which they are now defined:

(1) "Break" is a line interruption exceeding, for example, a time period of 180 milliseconds for energizing all the teleprinters on the line.

(2) "CAR RET" is a type basket carriage return function signal for returning the type basket to its initial typing position.

(3) "LTRS" is a shift signal for controlling the lower case letter shift lever of a conventional teleprinter.

(4) "FIGS" is a shift function signal for controlling the upper case letter shift lever of a conventional teleprinter.

(5) "CODE" is a particular call-code number or signal function assigned to each individual teleprinter on the line which must be followed by a "CAR RET" signal for each call-code combination if more than one teleprinter on the line is to be concurrently energized.

(6) "STOP" is a signal function for deenergizing the teleprinters.

The general operation of the teleprinter selective motor stop control is initiated by the "Break" signal which automatically energizes all of the teleprinters on the line. At this point, the transmission of a "STOP" signal would automatically shut off all of the teleprinters. The selective motor stop control utilizes the reception of the "CODE" or selective call-code signal by a specific teleprinter machine or machines prior to the transmission of the "STOP" signal to block the desired machines from the effects of a "STOP" signal and shut off all of the other machines on the line. Therefore, the teleprinter machines on the party line will receive and print only properly addressed or coded messages.

For the purposes of clarity, the subject invention will be described in conjunction with a known prior art device which is known in the trade as either a Teletype Model 15 or Model 19 teleprinter having an original motor stop control circuit similar to that shown in Patent 1,566,295 to Watson, issued December 22, 1955. The Model 15 and Model 19 teleprinters of Teletype Corp. are disclosed by many U.S. patents of which Patents 2,323,921 to Lake, issued July 13, 1943; 2,257,553 to Hept, issued September 30, 1941; and 1,811,131 to Kleinschmidt, issued June 23, 1931, are listed here for the purpose of examples.

Figure 1:
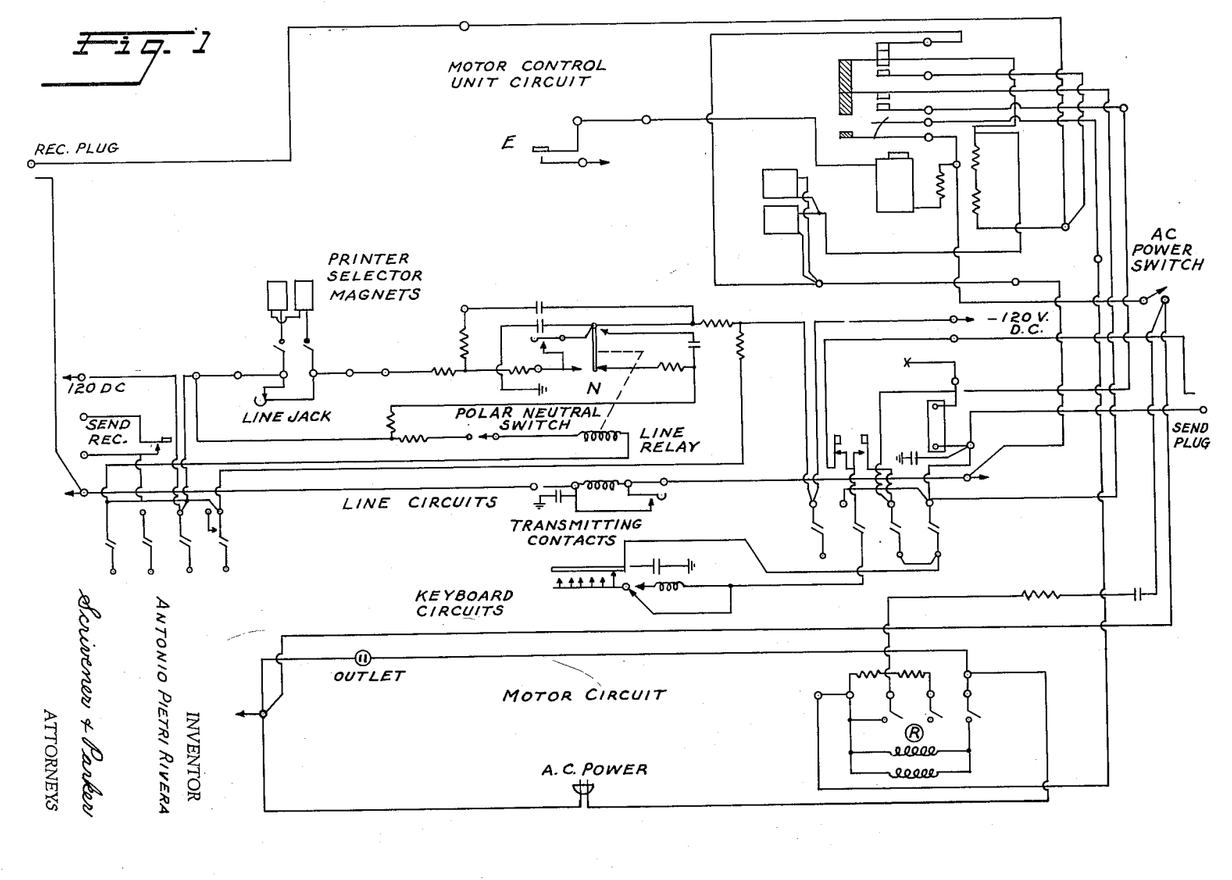
Figure 1 is a schematic circuit diagram of the Teletype Model 15 and Model 19 teleprinters incorporating a prior art motor control system.

Referring in detail to the drawings, Figure 1 shows a common commercial circuit for Teletype Model 15 and Model 19 teleprinters which is one of several similar systems to which the selective motor stop control may be added.

Figure 1 will be discussed in generalities only, by the legends thereon, since it is of a type well known in the prior art.

The primary components of interest in Figure 1 are the line relay N, the motor stop function contact assembly E and the entire motor control unit circuit indicated by legend in the drawing. These are the only components to which the physical and electrical modifications must be made to convert the original system shown to a system incorporating the selective motor stop control.

The above described components will be identically labelled throughout the remainder of the specification and drawings.

Figure 2:
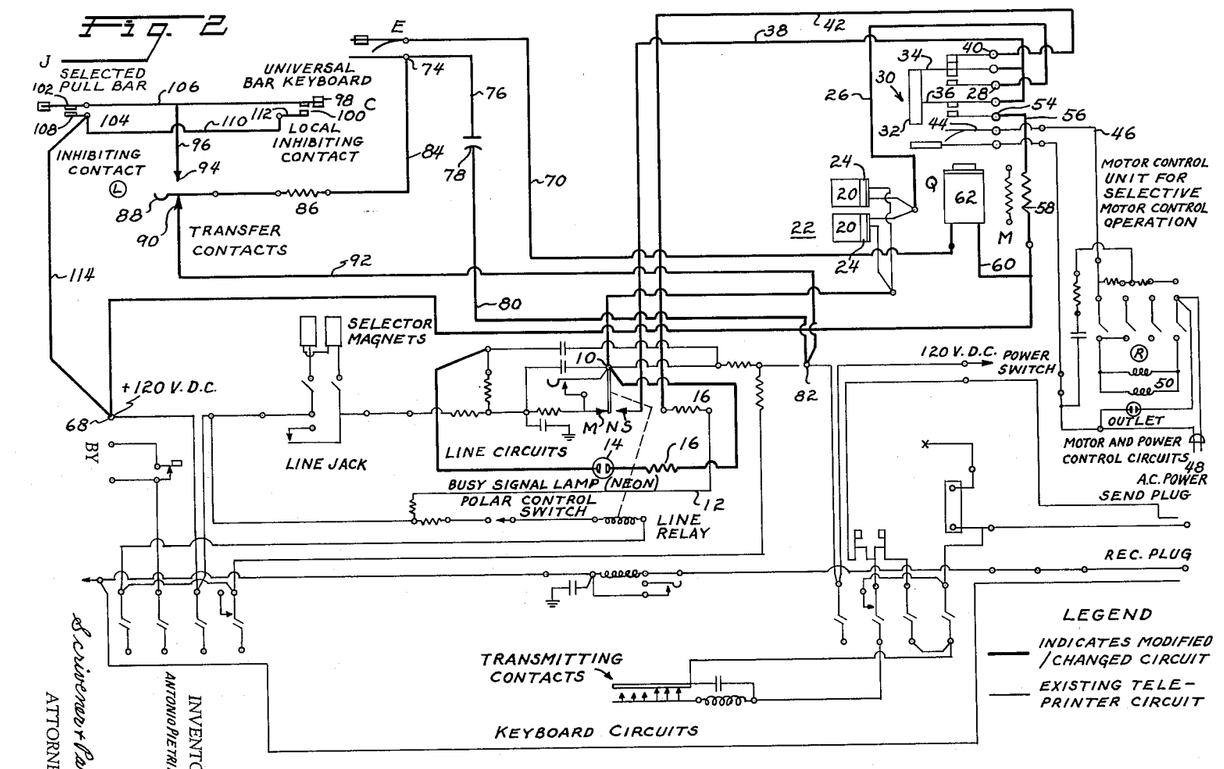
Figure 2 is a modification of Figure 1 incorporating my invention as shown by the heavy lines therein.
Figure 3:
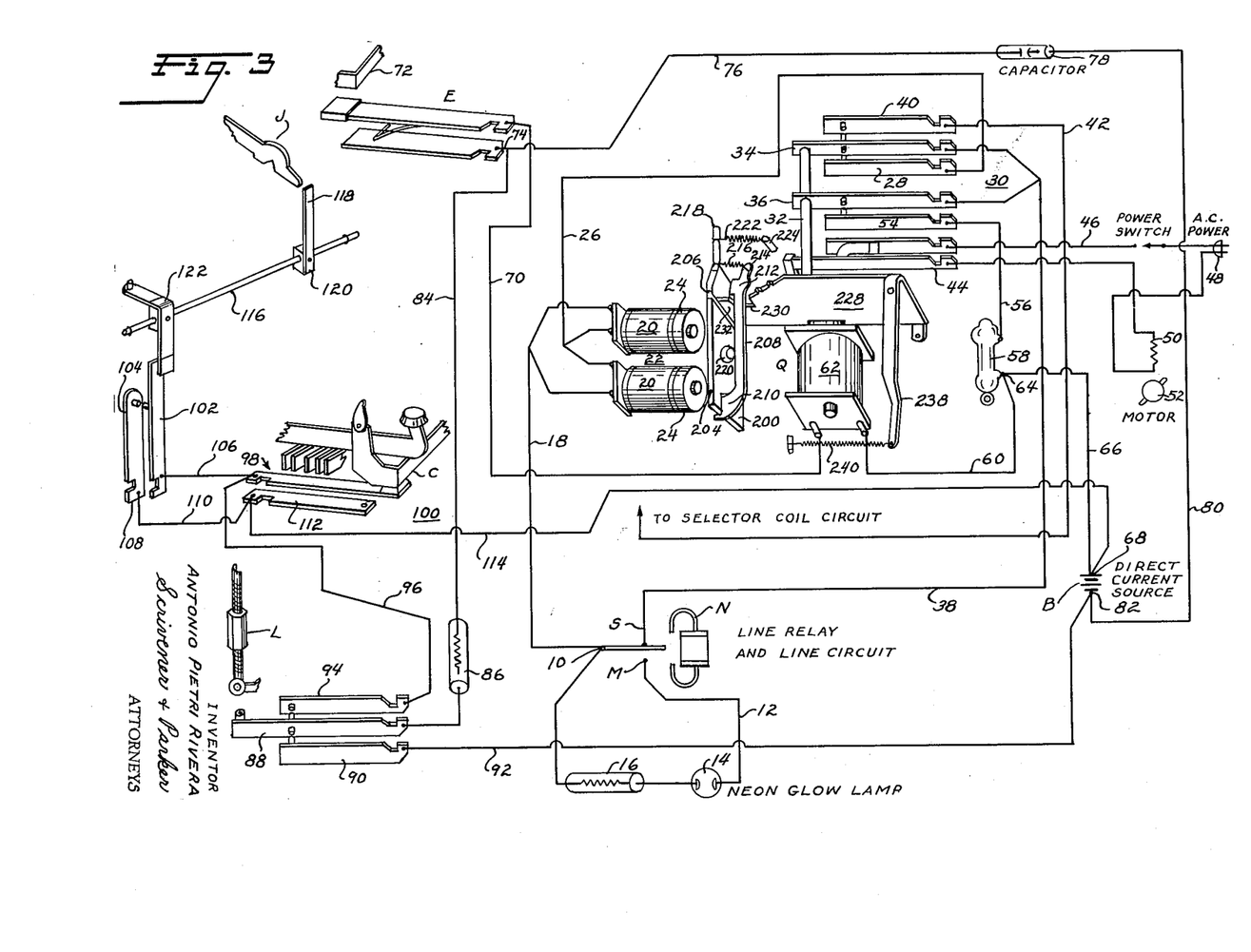
Figure 3 is a detailed electromechanical showing of an embodiment of my invention with essential machine parts shown in whole or in part therein.

Referring to Figures 2 and 3, line relay N is shown as having "mark" and "space" contacts M and S, respectively. Through a common contact point 10, the "mark" contact M is connected in series with a "busy" lamp circuit 12 comprising a neon bulb 14 and series resistor 16. The "space" contact S is connected through the common contact point 10 and line 18 to the relay coils 20 of a mechanical interlock relay 22. A pair of magnetic field retarding copper slugs 24 are added one to each of the relay coils 20 for a purpose to be hereinafter described.

The relay coils 20 are in turn connected through a line 26 to a front contact spring 28 in the contact array generally indicated at 30, of the alternating current motor control relay Q. The spring contact assembly 30 of the relay Q comprises a common actuating shaft 32 on which are mounted a pair of upper and lower main contact springs 34 and 36, respectively, which are commonly connected to a return line 38 which is arranged to complete the circuit back to the "space" contact S on the polar line relay N. A back contact blade 40 is provided for the upper main contact 34 to provide a circuit connection to the teleprinter selector magnet circuits as indicated in Figure 3 and shown in Figure 2. Also actuated by the alternating current motor control relay Q is a pair of motor circuit closing contacts 44 which complete the circuit through a line 46 and electric power source 48 to the windings 50 of an electric motor 52.

A front contact blade 54 is provided for the lower main contact spring 36 which is connected through a line 56, a resistor 58 and a line 60 to one side of the winding 62 of the alternating current motor control relay Q. A common connection 64 on the side of the resistor 58 adjacent the winding 62 is connected through a line 66 to the positive terminal 68 of a direct current source B. The other side of the relay winding 62 is connected through a line 70 to one of a pair of contact springs E which are actuated in accordance with the "STOP" signal function lever 72. The other contact spring of the pair E has a common connection 74 which is connected through a line 76, a "CODE" signal storage capacitor 78 and a line 80 to the negative terminal 82 of the direct current source to complete a circuit through the "CODE" signal storage capacitor 78 and the direct current source when the "STOP" signal contact pair E is closed.

The common contact terminal 74 of the "STOP" signal contact pair E is connected through a line 84 and a resistor 86 to the central switch blade 88 of the "FIGS" and "LTRS" signal function contact group. The "LTRS" function contact blade 90 is connected directly to the negative terminal 82 of the direct current source via a line 92. The central switch blade 88 of the "FIGS"-"LTRS" contact group is actuated by the motion of the letters function shift lever L shown in fragmentary form in Figure 3.

The "FIGS" function contact blade 94 is connected through a line 96 to the upper contact 98 of a pair of local inhibiting contacts 100 which are actuated by the universal teleprinter type bar C shown in fragmentary form in Figure 3. The upper contact 98 is directly connected by a line 106 to the upper contact 102 of a pair of "CAR RET" contact members 104 associated with the "CAR RET" signal function and preselected teleprinter pull-rod J. The lower carriage return contact member 108 is connected through a line 110 to the lower local inhibiting contact 112 and thence through a line 114 to the positive terminal 68 of the direct current source.

The operating linkage for the "CAR RET" contact group comprises a journalled activating bar 116 fastened across the front of the teleprinter type cage on a line parallel to the carriage return motion having a sliding contact extension 118 and locking clamp 120 attached thereto and located adjacent the position of the selected pull-rod J for active cooperation therewith. At a point on the actuating bar 116 adjacent the "CAR RET" contact group 104 is mounted an additional contact extension and locking clamp combination 122 for cooperating directly with the contact group.

Figure 4:
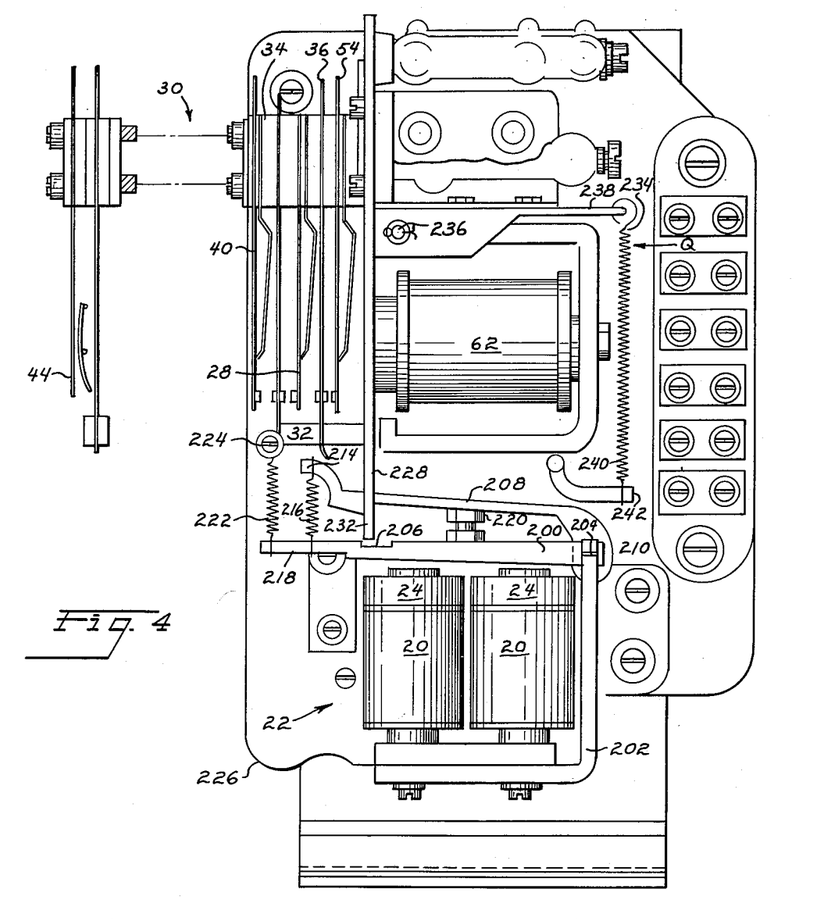
Figure 4 is a physical embodiment of my invention.

Referring to Figures 3 and 4, the cooperating structures of the mechanical interlock relay 22 and the alternating current motor control relay Q are shown in detail.

The armature of the mechanical interlock relay comprises a main flat plate section 200 hinged at one end thereof to a mounting bracket 202 on which the relay windings 20 are held. The hinge connection is shown as having an axis 204. Located intermediate the ends of the plate 200 and in the surface thereof which faces away from the copper slugs 24 on the windings 20, is a motion limiting slot 206, the purpose of which will be hereinafter described.

A control armature latch member 208 having a substantially J-shaped profile as shown, is pivoted to the axis 204 by the end portion 210 of the J-shaped section and the straight shank portion thereof extends along the longitudinal axis of the rectangular main plate section 200. A locking detent 212 is located adjacent the outer tip of the straight shank portion of the armature latch member 208 for a purpose to be hereinafter described. The outermost tip 214 of the straight shank portion is attached through a tension spring 216 to an end projection 218 on the main armature plate 200 to bias the armature latch member 208 toward the main plate section 200 about the pivot axis 204. A variable stop member 220 is positioned beneath the straight shank portion of the armature latch member 208 and secured to the main plate section 200 to limit the movement of the armature latch member 208 in the direction of the main plate section 200. The end projection 218 of the main plate section 200, is biased away from the copper slugs 24 about the pivot axis 204 by means of a tension spring 222 which is held by an anchoring screw 224 to the chassis or mounting plate 226 of the unit.

The armature mechanism of the alternating current motor control relay Q is shown to be in operative relation with the armature assembly of the mechanical interlocking relay 22. The control armature plate 228 of the motor control relay Q has a latching slot 230 therein which partially envelops the straight shank of the control armature latch member 208 adjacent the locking detent 212 thereon with which the latching slot 230 cooperates. The outer edge 232 of the control armature plate 228 located between the control armature latch member 208 and the main plate section 200 of the mechanical latching relay 22, is loosely housed in the motion limiting slot 206 of the main plate section 200, whereby the contact opening and closing movement thereof is held within predetermined limits.

The control armature plate 228 is pivotally mounted to the supporting bracket 234 of the motor control relay winding 62 by means of a pivot pin 236. A dependent lever arm 238 perpendicular to the control armature plate 228 is extended along the supporting bracket 234 and is connected to the chassis 226 by means of a tension spring 240 and anchor member 242. The action of the tension spring 240 biases the control armature plate about the pivot pin 236 in a back-contact closing direction. The control armature plate 228 actuates the main switch blade rod 32 for controlling the contact of the control switch array 30.

Figure 5:
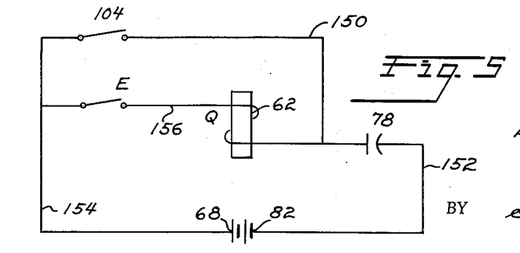
Figure 5 is a basic diagram illustrating the principle of operation of my invention.

Referring to Figure 5, the circuit diagram shown is for the purpose of illustrating the principle of operation of the subject device in simplified form.

The carriage return or "CAR RET" contact group 104 is shown as the switching means in an outer circuit loop comprising a line 150, selective signal storing capacitor 78, line 152, a direct current source B having positive and negative terminals 68 and 82, respectively, and a line 154 from the positive terminal 68 back to the contact group 104.

Connected from the line 154 between the "CAR RET" contact group 104 and the positive terminal 68 of the direct current source B to the line 150 between the contact group 104 and the selective signal storing capacitor 78, is a circuit branch 156 comprising the "STOP" signal contact group E connected in series with the control winding 62 of the alternating current motor control relay Q. The circuit branch 156 forms an inner circuit loop with the selective signal storing capacitor 78, line 152, direct current source B and line 154. As a result, the inner branch 156 is in parallel with the outer branch 158 which comprises the "CAR RET" contact group 104 and the line 150.

The operating of the selective motor stop control will be described in full following a description of operation of the simplified system of Figure 5 and the interacting motor control and latching relays as shown in Figures 3 and 4 for the purpose of complete clarity.

Referring to Figure 5, if the "CAR RET" contact group 104 is in the open position and a "STOP" signal function is received which causes the "STOP" signal contact group E to close, a transient current will flow through switch group E and winding 62 of the motor control relay Q due to the action of the selective signal storage capacitor 78 which was in an uncharged state at the time the "STOP" signal contact group E was closed.

If it is desired to transmit a message to the teleprinter controlled by the circuit of Figure 5, the particular call-code or "CODE" signal function is transmitted to actuate the "CAR RET" contact group 104 to a closed position by suitable means not shown. The closing of the switch group 104 charges the selective signal storing capacitor 78 to its rated capacity. Now, upon reception of a "STOP" function signal, the "STOP" signal contact group E is actuated to a closed position. Since the capacitor 78 has already been charged, however, no transient current will flow through the winding 62 of the motor control relay Q and the relay will not be activated, leaving the teleprinter motor running and ready for the reception of transmitted messages.

Referring to Figures 3 and 4, the interlocking operation of the mechanical latching relay 22 and the alternating current motor control relay Q is as follows:

Initially, the control windings 20 of the mechanical latching relay 22 are energized by a suitable current source. Therefore, the main plate section 200 of the latching relay armature is in juxtaposition with the magnetic field retarding copper slugs 24.

As a result, edge portion 232 of the control armature plate 228 is housed against one edge of the motion limiting slot 206 in the main plate section 200. Also, the locking detent 212 on the control armature latch member 208 is held in locking engagement with the lock slot 230 in the control armature plate 228 for holding same in a front contact closing position. The common contact control rod 32 is thus held down by the control armature plate 228 so that contact pairs 28—34 and 36—54., respectively, are in a closed position.

If the control winding 20 of the mechanical latching relay are deenergized, the main armature plate 200 remains actuated for a predetermined time delay period determined by the magnetic field retarding copper slugs 24. Upon the decay of the magnetic field in the windings 20, the main armature plate 200 is moved away from the copper slugs 24 by means of the tension spring 222. This movement forces the locking detent 212 out of engagement with the lock slot 230, thereby releasing the control armature plate to the action of the dependent lever arm 238 and tension spring 240. Thus, the common contact rod 32 is driven to a back contact closed position by the motion of the control armature plate 228 to close contact blades 34 and 40.

Subsequently, if the relay control winding 62 of the control relay Q is energized, the control armature plate 228 will return to its actuated or locked position bringing the lock slot 230 and edge portion 232 into locking engagement with the locking detent 212 and motion limiting slot 206 respectively.

Having described the operations of both a simplified system and an essential component of the overall system, the following is a description of operation of the complete selective motor stop control system as shown in Figures 2 and 3.

Upon reception of a "Break" function signal of a predetermined time duration, the polar line relay N will respond to close the "space" contact S. When the "space" contact S is closed, a circuit is completed through common connection 10, line 18, windings 20 of latching relay 22, line 26, front contact spring 28, main contact spring 34 and line 38 back to the "space" contact S to short circuit the control windings 20. At this point, the magnetic field retarding action of the copper slugs 24 holds the main plate section 200 in the actuated position for a predetermined time interval after which the plate section 200 and the control armature plate 228 will be released to close contact pairs 34—40 and motor control contacts 44 to start the teleprinter motor 52.

The next signal function in the call series is the "CAR RET" signal which causes the type basket of the teleprinter and consequently activating bar 116 to return to the initial typing position at the left hand margin of the type sheet. In this position, the adjustable right hand contact extension 118 has been moved to a point adjacent the particular call-code pull-bar J which is preselected for each individual teleprinter machine. The left hand contact extension 122, is now positioned adjacent the inhibiting spring contact group 104 in readiness for the reception of the "CODE" signal function.

The "LTRS" function signal is now received, causing the function shift lever L to close spring contacts 88 and 90 and discharge the selective signal storing capacitor 78 through resistor 86, line 84, common connection 74, line 76, line 80 and line 92 to the negative terminal 82 of the direct current source B.

Immediately thereafter, the "FIGS" function signal is received which causes the shift lever L to close contact springs 88 and 94 to prepare a current path for charging the selective signal storing capacitor 78. Starting with contact 102 of the "CAR RET" contact group 104, the circuit proceeds through line 106, contact 98, line 96, contact 94, contact 88, resistor 86, line 84, common terminal 74, line 76, capacitor 78, line 80, negative terminal 82 of the direct current source B, positive terminal 68, line 114, contact 112 and line 110 to the opposite contact blade 108 of the "CAR RET" switch group 104, which at this time is in an open position.

If the proper "CODE" function signal or selective call-code sequence for the particular teleprinter is received, meaning the transmitted message on the line is to be reproduced by the machine, the preselected code actuated pull-bar J strikes the right hand contact extension 118 on the activating rod 116 which rotates the rod 116 and the left hand contact extension 122, whereby the contacts 102 and 108 of the "CAR RET" switch group 104 are closed. The closing of the switch group 104 connects the direct current source across the selective signal storage capacitor 78 and charges it up to its designated voltage level.

The final call-code address signal function is the "STOP" function signal which energizes the stop function lever 72 to close the contacts of the "STOP" function contact group E. This closure of the contact group E completes a circuit through line 76, selective signal storage capacitor 78, line 80, negative terminal 82, positive terminal 68, line 66, terminal 64, line 60, control winding 62 of the control relay Q, and line 70 through the switch group E.

Thus, it can be seen that when the selective signal storage capacitor has been previously charged by the reception of the proper "CODE" signal function, the completion of the circuit through the "STOP" signal contact group E will have no transient current therein and the alternating current motor control relay Q will have no current in its control winding 62 and will remain in its unlocked "motor on" position.

If the proper pull-bar J on the machine is not operated by the proper call-code signal the capacitor 78 will be in a discharged state upon reception of the "STOP" signal function, the resultant closure of the "STOP" signal switch group E will result in a transient current flow through control winding 62 and the relay Q will be energized to open the motor contact 44 and shut off the teleprinter.

As may be seen from the above, I have provided a novel and extremely adaptable selective motor stop control system for teleprinters and the like.

It is to be understood that the modifications shown are for the purposes of example only and are not intended to limit the scope of the appended claims.

In view of the foregoing description, it is believed the operation and use of the device is clear.

What is claimed is:

1. A selective motor stop control in combination with a teleprinter comprising, a teleprinter driving motor, control means for said motor, carriage return means for the type cage of said teleprinter to return said type cage to its initial typing position, selective signal actuated means, a selective signal responsive pull-bar on said teleprinter adjacent said selective signal actuated means for actuating said selective signal actuating means in response to a predetermined selective signal characteristic of said pull-bar, a selective signal storage capacitor connected in series with said motor control means, a lower case letters function signal responsive means for discharging said capacitor in response to a predetermined signal, a direct current source, an upper case letters function signal responsive means for connecting said capacitor in series with said direct current source and said selective signal actuated means whereby the reception of the particular selective signal characteristic of said pull-bar actuates said selective signal actuated means through said pull-bar to complete a circuit through said series connected direct current source and said capacitor to charge said capacitor in response to said selective signal and a motor stop function signal responsive means for connecting said control means for said motor and said capacitor in series with said direct current source in response to a predetermined stop function signal whereby said control means for said motor will be energized in response to said stop function signal to stop said motor when said selective signal storage capacitor is in a discharged condition.

2. The system described in claim 1 wherein said control means for said motor comprises a latching relay having a control winding, time delay release means on said control winding and a latching armature having its release time controlled by said time delay release means, a control relay having a multiple contact controlling armature member releasably interconnected with said latching armature of said latching relay and a line relay for selectively de-energizing said control winding of said latching relay in response to a predetermined line break or space function signal.

3. The system as described in claim 1 wherein said selective signal actuated means comprises an activating rod rotatably connected across the front of said type cage, a first contact extension mounted on said activating rod adjacent said pull bar, a second contact extension mounted on said activating rod in spaced apart relation with said first contact extension and a selective signal actuated switch means adjacent said activating rod immediately opposite said second contact extension.

4. In a selective motor stop control in combination with a teleprinter, in combination, a teleprinter driving motor, control means for said driving motor, a selective signal storage capacitor in operative relationship with said motor control means such that a charging current therethrough will energize said motor control means and preventing actuation thereof when said capacitor is in a charged condition, and a lower case letter function signal responsive means in operative relationship with said capacitor for discharging said capacitor in response to a predetermined signal to permit said motor control means to be energized by a subsequent signal.

5. In a selective motor stop control in combination with a teleprinter, in combination, a teleprinter driving motor, control means for said driving motor, a selective signal storage capacitor connected with said motor control means such that a charging current therethrough will energize said motor control means, and a lower case letter function signal responsive means in operative relationship with said capacitor for discharging said capacitor in response to a predetermined signal, a direct current source, and an upper case letters function signal responsive means in operative relationship with said capacitor for connecting said capacitor in series with said direct current source to provide a charging circuit for said capacitor through said direct current source whereby said motor control means can be energized.

6. In a selective motor stop control, in combination, a selective signal actuated means, a selective signal storage capacitor, a lower case letters function signal responsive means in operative relationship with said capacitor for discharging said capacitor in response to a predetermined signal, a direct current source and an upper case letters function signal responsive means in operative relationship with said capacitor for connecting said capacitor in series with said direct current source and said selective signal actuated means, whereby the reception of a particular selective signal actuates said selective signal actuating means to complete a circuit through said series connected direct current source and said capacitor to charge said capacitor in response to said selective signal.

7. In a selective motor stop control, in combination, a selective signal actuated means, a direct current source, a selective signal storage capacitor, and an upper case letters function signal responsive means in operative relationship with said capacitor for connecting said capacitor in series with said direct current source and said selective signal actuated means, whereby the reception of a particular selective signal actuates said selective signal actuated means to complete a circuit through said series connected direct current source and said capacitor to charge said capacitor in response to said selective signal.

8. In a selective motor stop control for teleprinters, in combination, a direct current source, a selective signal storage capacitor in series with said current source and connected to one terminal thereof and a parallel connected control network in series with said capacitor and said current source from the other terminal thereof, said control network comprising first and second parallel branch circuits, selective signal controlled switch means in said first branch for completing a first charging circuit for said selective signal storage capacitor through said current source in response to a predetermined condition, said second branch comprising series connected stop function signal operated switch means and a relay winding, said stop function signal operated switch means being adapted to complete a second charging circuit for said capacitor through said current source, whereby actuation of said selective signal switch means prior to the actuation of said stop function signal operated switch means charges said capacitor and prevents the flow of current from said current source through said relay winding when said stop function signal is received.

9. In a selective motor stop control system for teleprinters, in combination, a selective signal responsive pull bar, an activating rod rotatably connected across the front of the teleprinter type cage, a first contact extension mounted on said activating rod adjacent said pull-bar, direct current source B to the line 150 between the contact group 104 and the selective signal storing capacitor 78, is a circuit branch 156 comprising the "STOP" signal contact group E connected in series with the control winding 62 of the alternating current motor control relay Q. The circuit branch 156 forms an inner circuit loop with the selective signal storing capacitor 78, line 152, direct current source B and line 154. As a result, the inner branch 156 is in parallel with the outer branch 158 which comprises the "CAR RET" contact group 104 and the line 150.

The operating of the selective motor stop control will be described in full following a description of operation of the simplified system of Figure 5 and the interacting motor control and latching relays as shown in Figures 3 and 4 for the purpose of complete clarity.

Referring to Figure 5, if the "CAR RET" contact group 104 is in the open position and a "STOP" signal function is received which causes the "STOP" signal contact group E to close, a transient current will flow through switch group E and winding 62 of the motor control relay Q due to the action of the selective signal storage capacitor 78 which was in an uncharged state at the time the "STOP" signal contact group E was closed.

If it is desired to transmit a message to the teleprinter controlled by the circuit of Figure 5, the particular call-code or "CODE" signal function is transmitted to actuate the "CAR RET" contact group 104 to a closed position by suitable means not shown. The closing of the switch group 104 charges the selective signal storing capacitor 78 to its rated capacity. Now, upon reception of a "STOP" function signal, the "STOP" signal contact group E is actuated to a closed position. Since the capacitor 78 has already been charged, however, no transient current will flow through the winding 62 of the motor control relay Q and the relay will not be activated, leaving the teleprinter motor running and ready for the reception of transmitted messages.

Referring to Figures 3 and 4, the interlocking operation of the mechanical latching relay 22 and the alternating current motor control relay Q is as follows:

Initially, the control windings 20 of the mechanical latching relay 22 are energized by a suitable current source. Therefore, the main plate section 200 of the latching relay armature is in juxtaposition with the magnetic field retarding copper slugs 24.

As a result, edge portion 232 of the control armature plate 228 is housed against one edge of the motion limiting slot 206 in the main plate section 200. Also, the locking detent 212 on the control armature latch member 208 is held in locking engagement with the lock slot 230 in the control armature plate 228 for holding same in a front contact closing position. The common contact control rod 32 is thus held down by the control armature plate 228 so that contact pairs 28—34 and 36—54., respectively, are in a closed position.

If the control winding 20 of the mechanical latching relay are deenergized, the main armature plate 200 remains actuated for a predetermined time delay period determined by the magnetic field retarding copper slugs 24. Upon the decay of the magnetic field in the windings 20, the main armature plate 200 is moved away from the copper slugs 24 by means of the tension spring 222. This movement forces the locking detent 212 out of engagement with the lock slot 230, thereby releasing the control armature plate to the action of the dependent lever arm 238 and tension spring 240. Thus, the common contact rod 32 is driven to a back contact closed position by the motion of the control armature plate 228 to close contact blades 34 and 40.

Subsequently, if the relay control winding 62 of the control relay Q is energized, the control armature plate 228 will return to its actuated or locked position bringing the lock slot 230 and edge portion 232 into locking engagement with the locking detent 212 and motion limiting slot 206 respectively.

Having described the operations of both a simplified system and an essential component of the overall system, the following is a description of operation of the complete selective motor stop control system as shown in Figures 2 and 3.

Upon reception of a "Break" function signal of a predetermined time duration, the polar line relay N will respond to close the "space" contact S. When the "space" contact S is closed, a circuit is completed through common connection 10, line 18, windings 20 of latching relay 22, line 26, front contact spring 28, main contact spring 34 and line 38 back to the "space" contact S to short circuit the control windings 20. At this point, the magnetic field retarding action of the copper slugs 24 holds the main plate section 200 in the actuated position for a predetermined time interval after which the plate section 200 and the control armature plate 228 will be released to close contact pairs 34—40 and motor control contacts 44 to start the teleprinter motor 52.

The next signal function in the call series is the "CAR RET" signal which causes the type basket of the teleprinter and consequently activating bar 116 to return to the initial typing position at the left hand margin of the type sheet. In this position, the adjustable right hand contact extension 118 has been moved to a point adjacent the particular call-code pull-bar J which is preselected for each individual teleprinter machine. The left hand contact extension 122, is now positioned adjacent the inhibiting spring contact group 104 in readiness for the reception of the "CODE" signal function.

The "LTRS" function signal is now received, causing the function shift lever L to close spring contacts 88 and 90 and discharge the selective signal storing capacitor 78 through resistor 86, line 84, common connection 74, line 76, line 80 and line 92 to the negative terminal 82 of the direct current source B.

Immediately thereafter, the "FIGS" function signal is received which causes the shift lever L to close contact springs 88 and 94 to prepare a current path for charging the selective signal storing capacitor 78. Starting with contact 102 of the "CAR RET" contact group 104, the circuit proceeds through line 106, contact 98, line 96, contact 94, contact 88, resistor 86, line 84, common terminal 74, line 76, capacitor 78, line 80, negative terminal 82 of the direct current source B, positive terminal 68, line 114, contact 112 and line 110 to the opposite contact blade 108 of the "CAR RET" switch group 104, which at this time is in an open position.

If the proper "CODE" function signal or selective call-code sequence for the particular teleprinter is received, meaning the transmitted message on the line is to be reproduced by the machine, the preselected code actuated pull-bar J strikes the right hand contact extension 118 on the activating rod 116 which rotates the rod 116 and the left hand contact extension 122, whereby the contacts 102 and 108 of the "CAR RET" switch group 104 are closed. The closing of the switch group 104 connects the direct current source across the selective signal storage capacitor 78 and charges it up to its designated voltage level.

The final call-code address signal function is the "STOP" function signal which energizes the stop function lever 72 to close the contacts of the "STOP" function contact group E. This closure of the contact group E completes a circuit through line 76, selective signal storage capacitor 78, line 80, negative terminal 82, positive terminal 68, line 66, terminal 64, line 60, control winding 62 of the control relay Q, and line 70 through the switch group E.

Thus, it can be seen that when the selective signal storage capacitor has been previously charged by the reception of the proper "CODE" signal function, the completion of the circuit through the "STOP" signal contact group E will have no transient current therein and the alternating current motor control relay Q will have no current in its control winding 62 and will remain in its unlocked "motor on" position.

If the proper pull-bar J on the machine is not operated by the proper call-code signal the capacitor 78 will be in a discharged state upon reception of the "STOP" signal function, the resultant closure of the "STOP" signal switch group E will result in a transient current flow through control winding 62 and the relay Q will be energized to open the motor contact 44 and shut off the teleprinter.

As may be seen from the above, I have provided a novel and extremely adaptable selective motor stop control system for teleprinters and the like.

It is to be understood that the modifications shown are for the purposes of example only and are not intended to limit the scope of the appended claims.

In view of the foregoing description, it is believed the operation and use of the device is clear.

What is claimed is:

1. A selective motor stop control in combination with a teleprinter comprising, a teleprinter driving motor, control means for said motor, carriage return means for the type cage of said teleprinter to return said type cage to its initial typing position, selective signal actuated means, a selective signal responsive pull-bar on said teleprinter adjacent said selective signal actuated means for actuating said selective signal actuating means in response to a predetermined selective signal characteristic of said pull-bar, a selective signal storage capacitor connected in series with said motor control means, a lower case letters function signal responsive means for discharging said capacitor in response to a predetermined signal, a direct current source, an upper case letters function signal responsive means for connecting said capacitor in series with said direct current source and said selective signal actuated means whereby the reception of the particular selective signal characteristic of said pull-bar actuates said selective signal actuated means through said pull-bar to complete a circuit through said series connected direct current source and said capacitor to charge said capacitor in response to said selective signal and a motor stop function signal responsive means for connecting said control means for said motor and said capacitor in series with said direct current source in response to a predetermined stop function signal whereby said control means for said motor will be energized in response to said stop function signal to stop said motor when said selective signal storage capacitor is in a discharged condition.

2. The system described in claim 1 wherein said control means for said motor comprises a latching relay having a control winding, time delay release means on said control winding and a latching armature having its release time controlled by said time delay release means, a control relay having a multiple contact controlling armature member releasably interconnected with said latching armature of said latching relay and a line relay for selectively deenergizing said control winding of said latching relay in response to a predetermined line break or space function signal.

3. The system as described in claim 1 wherein said selective signal actuated means comprises an activating rod rotatably connected across the front of said type cage, a first contact extension mounted on said activating rod adjacent said pull bar, a second contact extension mounted on said activating rod in spaced apart relation with said first contact extension and a selective signal actuated switch means adjacent said activating rod immediately opposite said second contact extension.

4. In a selective motor stop control in combination with a teleprinter, in combination, a teleprinter driving motor, control means for said driving motor, a selective signal storage capacitor in operative relationship with said motor control means such that a charging current therethrough will energize said motor control means and preventing actuation thereof when said capacitor is in a charged condition, and a lower case letter function signal responsive means in operative relationship with said capacitor for discharging said capacitor in response to a predetermined signal to permit said motor control means to be energized by a subsequent signal.

5. In a selective motor stop control in combination with a teleprinter, in combination, a teleprinter driving motor, control means for said driving motor, a selective signal storage capacitor connected with said motor control means such that a charging current therethrough will energize said motor control means, and a lower case letter function signal responsive means in operative relationship with said capacitor for discharging said capacitor in response to a predetermined signal, a direct current source, and an upper case letters function signal responsive means in operative relationship with said capacitor for connecting said capacitor in series with said direct current source to provide a charging circuit for said capacitor through said direct current source whereby said motor control means can be energized.

6. In a selective motor stop control, in combination, a selective signal actuated means, a selective signal storage capacitor, a lower case letters function signal responsive means in operative relationship with said capacitor for discharging said capacitor in response to a predetermined signal, a direct current source and an upper case letters function signal responsive means in operative relationship with said capacitor for connecting said capacitor in series with said direct current source and said selective signal actuated means, whereby the reception of a particular selective signal actuates said selective signal actuating means to complete a circuit through said series connected direct current source and said capacitor to charge said capacitor in response to said selective signal.

7. In a selective motor stop control, in combination, a selective signal actuated means, a direct current source, a selective signal storage capacitor, and an upper case letters function signal responsive means in operative relationship with said capacitor for connecting said capacitor in series with said direct current source and said selective signal actuated means, whereby the reception of a particular selective signal actuates said selective signal actuated means to complete a circuit through said series connected direct current source and said capacitor to charge said capacitor in response to said selective signal.

8. In a selective motor stop control for teleprinters, in combination, a direct current source, a selective signal storage capacitor in series with said current source and connected to one terminal thereof and a parallel connected control network in series with said capacitor and said current source from the other terminal thereof, said control network comprising first and second parallel branch circuits, selective signal controlled switch means in said first branch for completing a first charging circuit for said selective signal storage capacitor through said current source in response to a predetermined condition, said second branch comprising series connected stop function signal operated switch means and a relay winding, said stop function signal operated switch means being adapted to complete a second charging circuit for said capacitor through said current source, whereby actuation of said selective signal switch means prior to the actuation of said stop function signal operated switch means charges said capacitor and prevents the flow of current from said current source through said relay winding when said stop function signal is received.

9. In a selective motor stop control system for teleprinters, in combination, a selective signal responsive pull bar, an activating rod rotatably connected across the front of the teleprinter type cage, a first contact extension mounted on said activating rod adjacent said pull-bar, a second contact extension mounted on said activating rod in spaced apart relation with said first contact extension and a selective signal actuated switch means adjacent said activating rod immediately opposite said second contact extension, whereby upon the reception of a particular selective signal function characteristic of said pull-bar, said pull-bar strikes said first contact extension to rotate said activating rod and said second contact extension whereby said second contact extension closes said selective signal actuated switch means.

10. In a selective motor stop control for teleprinters, in combination, a latching relay comprising a control winding, time delay release means on said control winding and a latching armature having its release time controlled by said time delay release means, a control relay having a multiple contact controlling armature member releasably interconnected with said latching armature of said latching relay and a line relay for selectively deenergizing said control winding of said latching relay in response to a predetermined line break or space function signal whereby the reception of a space function signal causes said line relay to short circuit said control winding of said latching relay and release said latching armature, said latching armature acting to release said multiple contact controlling armature after a time delay determined by said time delay means.

11. In a selective motor stop control for teleprinters, in combination, a latching relay having a latching armature and a control relay having a multiple contact controlling armature, said latching armature comprising an elongated main plate section pivoted at one end, a motion limiting slot in the surface of said main plate section adjacent its other end, a latch member pivoted at one end about the pivot axis of the pivoted end of said main plate section and extending along the longitudinal axis of said main plate section parallel to the surface thereof, a stop member on the surface of said main plate section intermediate said motion limiting slot and said pivoted end thereof in contact with the edge of said pivoted latch member to maintain said latch member at a minimum distance from the surface of said main plate section, locking detent on the edge of said latch member adjacent said motion limiting slot and a tension spring connected between the free end of said latch member and the free end of said main plate section whereby the edge of said latch member is held in juxtaposition with said stop member.

12. The combination described in claim 11 wherein said multiple contact controlling armature comprises an armature plate having one end thereof disposed within said motion limiting slot in the surface of said main plate section and a lock slot in said armature plate adjacent said one end adapted to engage said locking detent on said latching member, said armature plate being pivoted at its other end and spring biased about its pivot axis to force said lock slot into engagement with said locking detent whereby said one end is held in said motion limiting slot.

13. In a teleprinter, means for selectively preventing the energization of a motor control relay comprising, a capacitor, a direct current source and a first switch all in series with said relay for energizing same by the charging current drawn by said capacitor when said capacitor is in an uncharged condition prior to the closing of the said first switch; and a branch circuit connected in parallel with said relay and said first switch and in series with said capacitor and said direct current source and including a second switch, whereby when said capacitor is in an uncharged condition and prior to the closing of the said first switch, said second switch may be closed to charge said capacitor through said branch circuit such that when said first switch is closed, no charging current will flow through said relay to said capacitor and said relay will not be energized.

References Cited in the file of this patent

UNITED STATES PATENTS

| | | |
|---|---|---|
| 2,495,131 | Poulter | Jan. 17, 1950 |
| 2,505,729 | Zenner | Apr. 25, 1950 |
| 2,507,226 | Siezen | May 9, 1950 |
| 2,579,277 | Stanton | Dec. 18, 1951 |
| 2,708,218 | Nilson | May 10, 1955 |
| 2,738,455 | Doremus | Mar. 13, 1956 |
| 2,745,052 | Willemse | May 8, 1956 |
| 2,759,138 | Andrews | Aug. 14, 1956 |
| 2,771,575 | Hampton | Nov. 20, 1956 |